(12) United States Patent
Mankame et al.

(10) Patent No.: US 8,297,421 B2
(45) Date of Patent: Oct. 30, 2012

(54) ACTIVE MATERIALS ACTUATED ONE-WAY CLUTCH

(75) Inventors: Nilesh D. Mankame, Ann Arbor, MI (US); Alan L. Browne, Grosse Pointe, MI (US)

(73) Assignee: GM Global Technology Operations LLC, Detroit, MI (US)

(*) Notice: Subject to any disclaimer, the term of this patent is extended or adjusted under 35 U.S.C. 154(b) by 423 days.

(21) Appl. No.: 12/619,769

(22) Filed: Nov. 17, 2009

(65) Prior Publication Data

US 2011/0114434 A1  May 19, 2011

(51) Int. Cl.
*F16D 41/12* (2006.01)
(52) U.S. Cl. .................. 192/46; 192/47; 192/84.8
(58) Field of Classification Search .......... 192/46, 192/47, 84.92, 84.8
See application file for complete search history.

(56) References Cited

U.S. PATENT DOCUMENTS

| | | | | |
|---|---|---|---|---|
| 709,900 A * | 9/1902 | Gurney | ............. | 192/46 |
| 756,086 A * | 3/1904 | Weiler | ............. | 192/46 |
| 951,882 A * | 3/1910 | Goldberg | ............. | 192/46 |
| 2,525,817 A * | 10/1950 | MacAdams | ............. | 310/69 |
| 3,791,231 A * | 2/1974 | Geary | ............. | 74/142 |
| 3,799,692 A * | 3/1974 | Shields | ............. | 415/118 |
| 4,871,939 A * | 10/1989 | Clouser | ............. | 310/332 |
| 6,148,979 A * | 11/2000 | Roach et al. | ............. | 192/45.1 |
| 6,905,009 B2 * | 6/2005 | Reed et al. | ............. | 192/43.1 |
| 2006/0185957 A1 * | 8/2006 | Kimes et al. | ............. | 192/46 |

* cited by examiner

*Primary Examiner* — David D Le
*Assistant Examiner* — Lillian Nguyen
(74) *Attorney, Agent, or Firm* — Quinn Law Group, PLLC

(57) ABSTRACT

A one-way clutch for assisting the rotation of a rotary fluid motor includes a ratchet and a hub rotatable about a longitudinal axis relative to the ratchet. The ratchet includes a plurality of teeth, and the hub includes a pawl for engaging the teeth to rotate the ratchet in a single direction of rotation. A control device including an active material interconnects the pawl and the hub. The active material of the control device contracts in response to a control signal to move the pawl. An actuator including an active material is spirally wound around an outer periphery of the hub. The active material of the actuator contracts to spin the hub and thereby drive the ratchet.

15 Claims, 2 Drawing Sheets

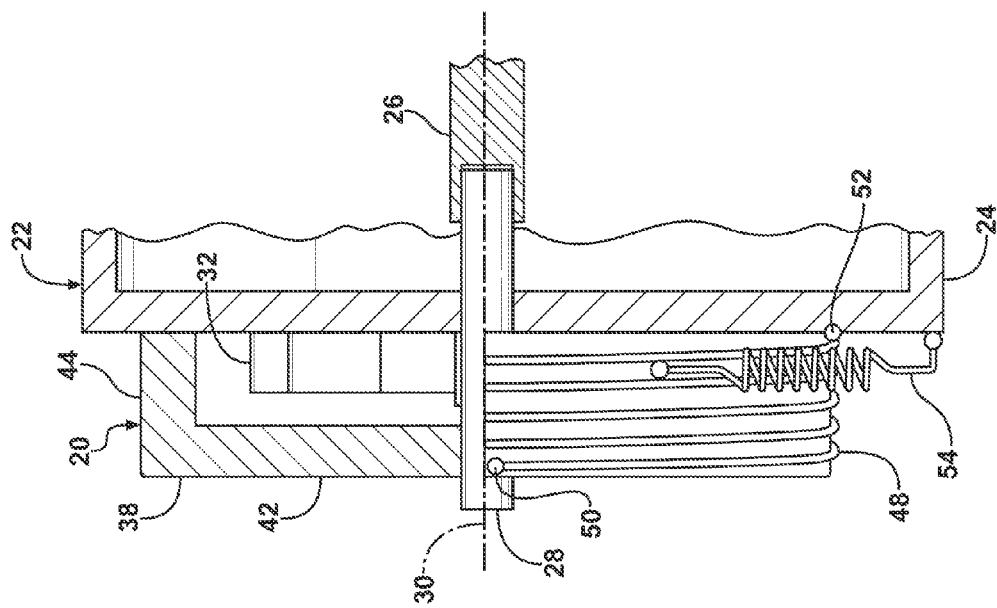
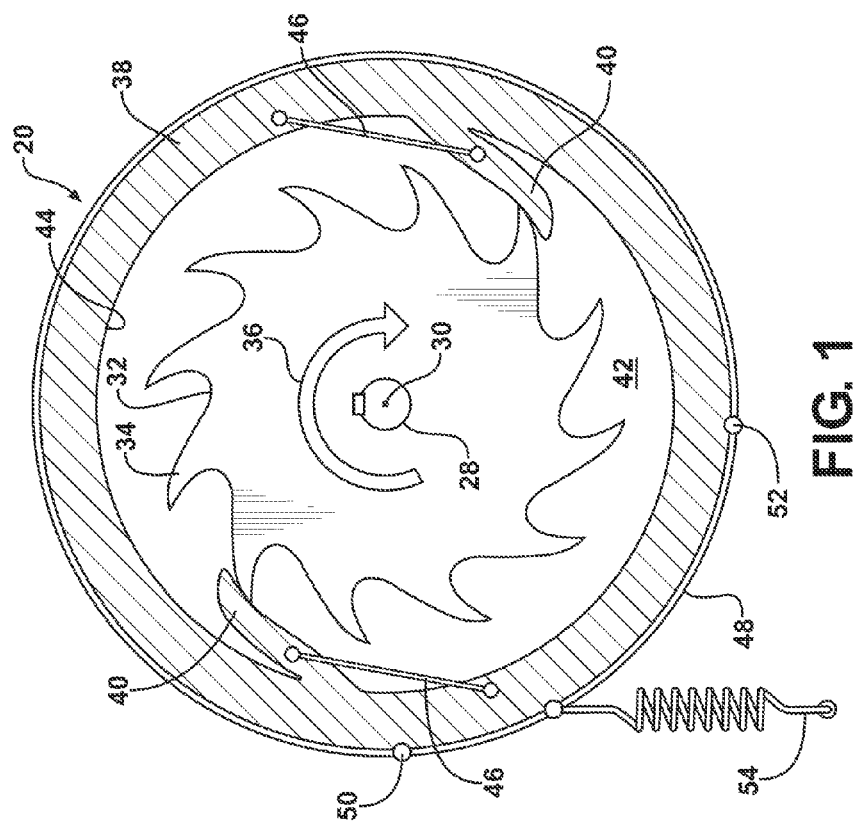

ACTIVE MATERIALS ACTUATED ONE-WAY CLUTCH

TECHNICAL FIELD

The invention generally relates to a clutch, and more specifically to a clutch configured for supplying a torque to a device, such as a rotary fluid motor, in a single direction of rotation.

BACKGROUND OF THE INVENTION

Rotary fluid motors are used in many types of heavy machinery. The rotary fluid motors use a hydraulic fluid to actuate the motor. At low temperatures, the hydraulic fluid thickens causing the response time of the rotary fluid motor to decrease.

The rotary fluid motor may incorporate an assist drive mechanism to temporarily rotate the rotary fluid motors during startup at low temperatures, when the flow of the fluid alone is insufficient to maintain operation of the rotary fluid motor. Accordingly, the assist drive mechanism provides initial rotation of the rotary fluid motor during cold weather startup, when the fluid is thickest.

SUMMARY OF THE INVENTION

In one aspect of the invention, a rotary fluid motor is provided. The rotary fluid motor includes a housing, and an output shaft configured for supplying a torque. A one-way clutch is attached to the housing. The one-way clutch includes a drive shaft coupled to the output shaft. The drive shaft extends along and is rotatable about a longitudinal axis, and supplies a torque to the output shaft. The one-way clutch further includes a ratchet, which is attached to the drive shaft. The ratchet rotates with the drive shaft about the longitudinal axis. The ratchet includes a plurality of teeth extending radially outward away from the longitudinal axis. The one-way clutch further includes a hub, which is rotatably coupled to the drive shaft. The hub rotates about the longitudinal axis relative to the drive shaft. The hub includes at least one pawl extending radially inward toward the ratchet. The at least one pawl is moveable between a disengaged position and an engaged position. The at least one pawl is disengaged from the plurality of teeth when in the disengaged position. The at least one pawl is engaged with the plurality of teeth, when in the engaged position, for rotating the ratchet and the drive shaft about the longitudinal axis. The one-way clutch further includes a control device attached to the at least one pawl and the hub. The control device includes an active material, and is configured to contract in response to a control signal. The control device contracts to move between an un-actuated position and an actuated position. The control device positions the at least one pawl in the engaged position when the control device is in the actuated position. The control device permits the at least one pawl to move into the disengaged position when the control device is in the un-actuated position. The one-way clutch further includes an actuator spirally wound around an outer periphery of the hub. The actuator includes a first end attached to the hub and a second end attached to the housing. The actuator further includes an active material configured to contract in response to an actuation signal. The actuator contracts to rotate the hub in a single direction about the longitudinal axis from an un-rotated position into a rotated position to drive the ratchet.

In another aspect of the invention, a one-way clutch is provided. The one-way clutch includes a drive shaft. The drive shaft extends along and is rotatable about a longitudinal axis, and is configured for supplying a torque to a device. A ratchet is attached to the drive shaft for rotation with the drive shaft about the longitudinal axis. The ratchet includes a plurality of teeth extending radially outward away from the longitudinal axis. A hub is rotatably coupled to the drive shaft for rotation about the longitudinal axis relative to the drive shaft. The hub includes at least one pawl extending radially inward toward the ratchet. The at least one pawl is moveable between a disengaged position and an engaged position. The at least one pawl is disengaged from the plurality of teeth when in the disengaged position. The at least one pawl is engaged with the plurality of teeth, when in the engaged position, for rotating the ratchet and the drive shaft about the longitudinal axis. A control device is attached to the at least one pawl. The control device is moveable between an un-actuated position and an actuated position in response to a control signal. The control device positions the at least one pawl in the engaged position when the control device is in the actuated position. The control device permits the at least one pawl to move into the disengaged position when the control device is in the un-actuated position.

Accordingly, the invention provides a one-way clutch capable of rotating a rotary fluid motor. The one-way clutch may be used during cold weather startup when a hydraulic fluid of the rotary fluid motor is thicker, and the response time of the rotary fluid motor would otherwise be reduced. The one-way clutch uses an active material control device to move the at least one pawl between the engaged position and the disengaged position to drive the ratchet, thereby rotating the rotary fluid motor when the hub is rotated and the pawls are engaged. The one-way clutch further uses an active material actuator to rotate the hub. Accordingly, the one-way clutch assists the rotation of the rotary fluid motor during initial cold weather startup, thereby increasing the response time of the rotary fluid motor during cold weather operations.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic front cross sectional view of a one-way clutch.

FIG. 2 is a schematic side cross sectional view of the one-way clutch coupled to a rotary fluid motor.

DESCRIPTION OF THE PREFERRED EMBODIMENTS

Figure 3:
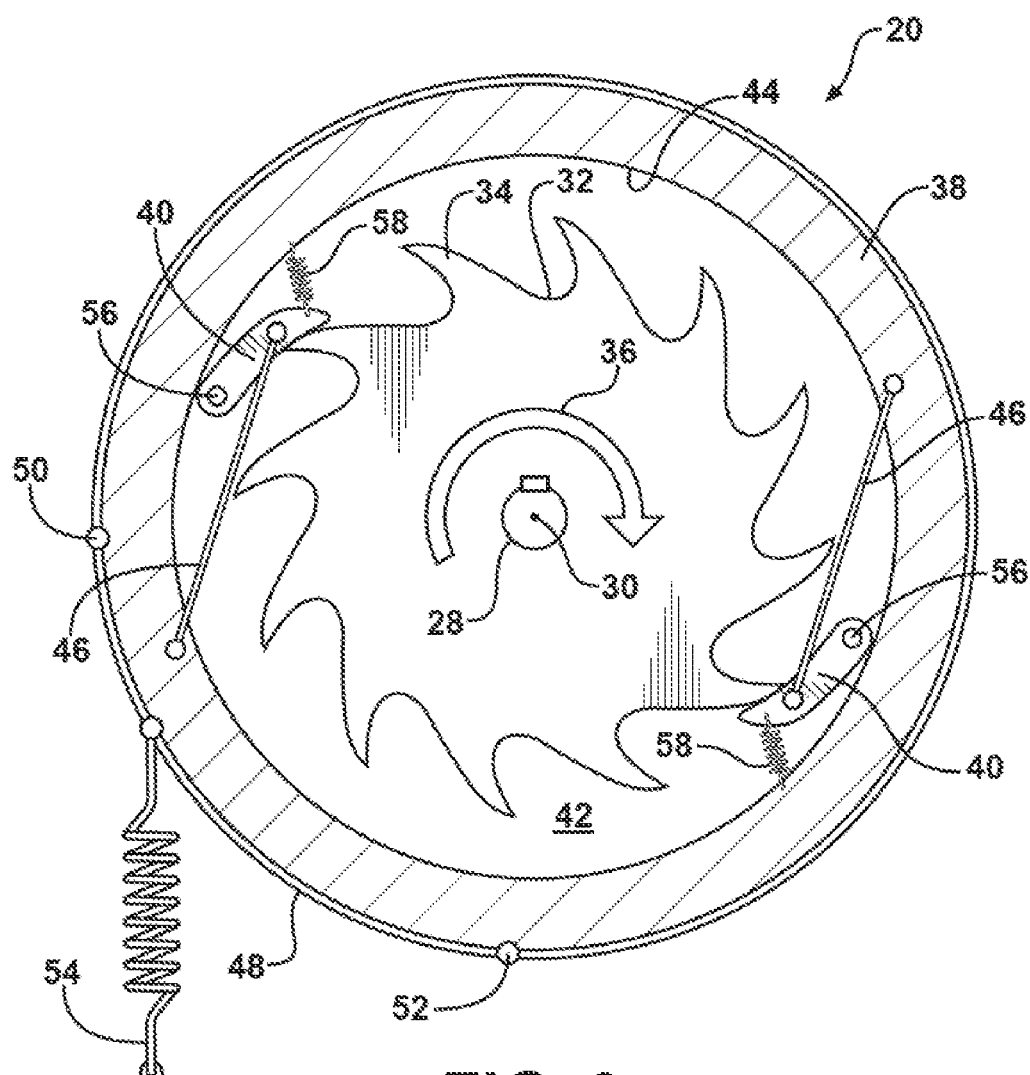
FIG. 3 is a schematic front cross sectional view of an alternative embodiment of the one-way clutch.

Referring to the Figures, wherein like numerals indicate like parts throughout the several views, a one-way clutch is shown generally at 20. Referring to FIG. 1, the one-way clutch 20 is attached to a device, such as but not limited to a rotary fluid motor 22. Accordingly, it should be appreciated that the one-way clutch 20 may be attached to a device other than the rotary fluid motor 22 described herein.

The rotary fluid motor 22 includes a housing 24, and circulates a hydraulic fluid to generate a torque in an output shaft 26. The output shaft 26 is configured to supply the torque as is well known. The rotary fluid motor 22 may include any suitable rotary fluid motor 22 capable of circulating the hydraulic fluid and generating a torque at the output shaft 26.

The specific type, configuration, size and/or design of the rotary fluid motor 22 is not relevant to the invention. As such, the rotary fluid motor 22 is only described and shown schematically, and is not described in detail herein.

The one-way clutch 20 is attached to the housing 24 of the rotary fluid motor 22. The one-way clutch 20 may be attached to the housing 24 in any suitable manner. Referring also to FIG. 2, the one-way clutch 20 includes a drive shaft 28. The drive shaft 28 extends along and is rotatable about a longitudinal axis 30. The drive shaft 28 is configured for supplying a torque to the device. More specifically, the drive shaft 28 is coupled to the output shaft 26 of the rotary fluid motor 22 and configured for transferring a torque from the drive shaft 28 of the one-way clutch 20 to the output shaft 26 of the rotary fluid motor 22.

The one-way clutch 20 further includes a ratchet 32. The ratchet 32 is attached to the drive shaft 28, and is rotatable with the drive shaft 28 about the longitudinal axis 30. The ratchet 32 may be affixed to the drive shaft 28 in any suitable manner capable of transmitting rotation about the longitudinal axis 30, such as but not limited to, a splined connection interconnecting the drive shaft 28 and the ratchet 32, or a keyed connection interconnecting the drive shaft 28 and the ratchet 32. The ratchet 32 includes a plurality of teeth 34 extending radially outward away from the longitudinal axis 30. The plurality of teeth 34 are radially spaced from the longitudinal axis 30, and are evenly spaced relative to each other about an outer periphery of the ratchet 32. Furthermore, the plurality of teeth 34 and the corresponding pawls 40 are angled so as to provide a catch in only a single direction of rotation, indicated by rotation arrow 36, as will be described in greater detail below.

The one-way clutch 20 further includes a hub 38. The hub 38 is rotatably coupled to the drive shaft 28, and is rotatable about the longitudinal axis 30 relative to the drive shaft 28. The hub 38 includes at least one pawl 40 extending radially inward toward the ratchet 32. As shown, the one-way clutch 20 includes a pair of pawls 40 diametrically opposed to each other on opposing sides of the ratchet 32. However, it should be appreciated that the hub 38 may include any number of pawls 40, and that the pawls 40 may be spaced around the ratchet 32 in any configuration.

The pawls 40 are moveable between a disengaged position and an engaged position. The pawls 40 are disengaged from the plurality of teeth 34 on the ratchet 32 when the pawls 40 are in the disengaged position. The pawls 40 are engaged with the plurality of teeth 34 when the pawls 40 are in the engaged position. The pawls 40 are configured for rotating the ratchet 32 and the drive shaft 28 about the longitudinal axis 30 when the pawls 40 are in the engaged position. When in the engaged position and rotated in the single direction of rotation, the pawls 40 engage the teeth 34 on the ratchet 32 in interlocking engagement. When rotated in a direction of rotation opposite the single direction of rotation, the pawls 40 slide over the teeth 34 and fail to engage the teeth 34 on the ratchet 32, even when in the engaged position. Accordingly, the pawls 40 are only capable of driving the ratchet 32 in the single direction of rotation.

The hub 38 includes a plate portion 42 extending radially outward from the longitudinal axis 30, and an annular wall portion 44 extending axially along the longitudinal axis 30. The annular wall portion 44 extends from an outer periphery of the plate portion 42 along the longitudinal axis 30, toward the housing 24 of the rotary fluid motor 22. The at least one pawl 40 extends radially inward toward the longitudinal axis 30 from an inner surface of the annular wall portion 44. As shown in FIG. 1, the at least one pawl 40 is integrally formed with the hub 38. The hub 38 and the pawls 40 include and are manufactured from a compliant material. The compliant material operates to bias the at least one pawl 40 into the disengaged position. Accordingly, it should be appreciated that the hub 38 and the pawls 40 are formed into an initial position in which the compliant material tends to keep the pawls 40 in the disengaged position. The compliant material may include any suitable material including, but not limited to, a plastic, a rubber, a polypropylene material, a nylon material, a polyurethane material, a GRF-epoxy composite, a HDPE material, a titanium material, an aluminum material, a steel material and a beryllium-copper (CA170) material.

The one-way clutch 20 further includes a control device 46 attached to the at least one pawl 40. The control device 46 is further attached to the hub 38, and includes a linear actuator configured to exert an actuation force, i.e., linearly contract in response to a control signal. The control device 46 is moveable between an un-actuated position and an actuated position. The control device 46 exerts the actuation force to move the at least one pawl 40 from one of the engaged position and the disengaged position into the other of the engaged position and the disengaged position. As shown and described herein, the control device 46 exerts the actuation force to move the pawls 40 from the disengaged position into the engaged position. The control device 46 moves between the un-actuated position and the actuated position in response to a control signal. When the control device 46 is in the actuated position, the control device 46 positions the pawls 40 in one of the engaged position and the disengaged position. When the control device 46 is in the un-actuated position, the control device 46 permits the natural elasticity of the hub material to bias the pawls 40 into the other of the engaged position and the disengaged position. As shown, when the control device 46 is in the actuated position, the control device 46 positions the pawls in the engaged position, and when the control device 46 is in the un-actuated position, the control device 46 allows the pawls to move into the un-actuated position.

The control device 46 includes an active material. Accordingly, the control device 46 may be defined as an active material control device 46. The active material of the control device 46 may include, but is not limited to, an active material chosen from a group of active materials including: a shape memory alloy, a piezoelectric material, an electroactive polymer, a ferromagnetic shape memory alloy, a magnetostrictive material, and an electrostrictive material. The active materials that may be used for the control device 46 are described in greater detail below.

The control signal actuates the active material of the control device 46, causing the control device 46 to contract and thereby move from the un-actuated position into the actuated position. Upon interruption of the control signal, the control device 46 returns to its natural shape and/or condition, thereby returning to the actuated position into the un-actuated position. The control signal used to actuate the control device 46 may include, but is not limited to, a control signal chosen from a group of control signals including: a heat signal, a magnetic signal, an electrical signal, a fluidic signal and a mechanical signal. It should be appreciated that the control signal may include any signal capable of causing the control device 46 to move between the un-actuated position and the actuated position. The types of signals that may be used for the control signal are described in greater detail below.

The one-way clutch 20 further includes an actuator 48. The actuator 48 operates to exert a force on the hub to generate rotation of the hub 38 about the longitudinal axis 30 in a single direction. The control device 46 operates to mechanically couple or de-couple the pawls 40 from the teeth 34. When the pawls 40 are disposed in the engaged position, the rotation of the hub 38 by the actuator 48 rotates the pawls 40 into interlocking engagement with the teeth 34 on the ratchet 32, thereby causing the ratchet 32 to rotate about the longitudinal axis 30. Rotation of the ratchet 32 about the longitudinal axis 30 rotates the drive shaft 28 about the longitudinal axis 30, which supplies the output shaft 26 of the rotary fluid motor 22 with a torque, i.e., causes the output shaft 26 of the rotator fluid motor to rotate. As such, the one-way clutch 20 may provide rotation to the rotary fluid motor 22 when the viscosity of the hydraulic fluid is low during initial start-up at low temperatures.

As shown, the actuator 48 includes a first end 50 attached to the hub 38 at a first connection point, and a second end 52 configured for attachment to a support. As shown, the second end 52 is attached to the housing 24 of the rotary fluid motor 22 at a second connection point. However, it should be appreciated that the second end 52 of the actuator 48 may be attached to some other fixed object. As shown, the actuator 48 is spirally wound about an outer periphery of the hub 38, and is configured to exert a force, i.e., contract, in response to an actuation signal. The actuator 48 contracts to rotate the hub 38 in the single direction of rotation about the longitudinal axis 30. As such, the actuator 48 is moveable between an un-rotated position and a rotated position. Movement of the actuator 48 from the un-rotated position into the rotated position rotates the hub 38 in the single direction of rotation, permitting the pawls 40 to engage the angled teeth 34 on the ratchet 32 in interlocking engagement. As described above, rotation of the hub 38 in the single direction of rotation drives the ratchet 32, and thereby the drive shaft 28 of the one-way clutch 20. Movement of the actuator 48 from the rotated position into the un-rotated position rotates the hub 38 opposite the single direction of rotation, such that the pawls 40, even if positioned in the engaged position, slide over the angled teeth 34 and fail to engage the angled teeth 34 of the ratchet 32 in interlocking engagement.

The actuator 48 includes and is manufactured from an active material. Accordingly, the actuator 48 includes an active material actuator 48. The active material of the actuator 48 may include, but is not limited to, an active material chosen from a group of active materials including: a shape memory alloy, a piezoelectric material, an electroactive polymer, a ferromagnetic shape memory alloy, a magnetostrictive material and an electrostrictive material. The active materials that may be used for the actuator 48 are described in greater detail below.

The actuation signal actuates the active material of the actuator 48, causing the actuator 48 to contract and thereby move from the un-rotated position into the rotated position. Upon interruption of the actuation signal, the actuator 48 returns to its natural shape and/or condition, thereby returning from the rotated position into the un-rotated position. The actuation signal used to actuate the actuator 48 may include, but is not limited to, an actuation signal chosen from a group of actuation signals including: a heat signal, a magnetic signal, an electrical signal, a fluidic signal and a mechanical signal. It should be appreciated that the actuation signal may include any signal capable of causing the actuator 48 to move between the un-rotated position and the rotated position. The type of signals that may be used for the actuation signal are described in greater detail below.

The one-way clutch 20 may further include a re-set device 54. The re-set device 54 is configured to rotate the hub 38 in a direction opposite the single direction of rotation, and to move the actuator 48 from the rotated position back into the un-rotated position. Accordingly, the re-set device 54 is coupled to the hub 38 and configured for biasing the hub 38 into the un-rotated position. The re-set device 54 may include any suitable device capable of biasing the hub 38 for rotation in a direction of rotation opposite the single direction of rotation. Accordingly, the re-set device 54 may include, but is not limited to, a spring, an active material device or the like.

As shown, the one-way clutch 20 includes a single actuator 48. However, it is contemplated that the one-way clutch 20 may include a plurality of actuators 48 to increase the torque provided to the rotary fluid motor 22, or to enable quicker regeneration times between activations of the actuator 48.

Referring to FIG. 3, an alternative embodiment of the one-way clutch 20 is shown. The alternative embodiment of the one-way clutch 20 operates in the same manner as described above. However, in the alternative embodiment of the one-way clutch 20, the at least one pawl 40 is not integrally formed with the hub 38 from the compliant material. Rather, the alternative embodiment of the one-way clutch 20 includes a pivotable connection 56 interconnecting the at least one pawl 40 and the hub 38. The at least one pawl 40 is pivotable about a pivot axis during movement between the engaged position and the disengaged position.

The alternative embodiment of the one-way clutch 20 further includes a return device 58. The return device 58 is attached to the at least one pawl 40, and is configured for biasing the at least one pawl 40 into the disengaged position. The return device 58 may include, but is not limited to, a spring, an active material, or some other device capable of biasing the pawls 40 into the disengaged position. If the return device 58 includes and is manufactured from an active material, then the type of active materials that may be used are described in greater detail below.

In both the primary embodiment and the alternative embodiment of the one-way clutch 20 described and shown herein, the control device 46 is described as being operable to move the pawls 40 from the disengaged position into the engaged position. However, it should be appreciated that the one-way clutch 20 may alternatively be configured to move the pawls 40 from the engaged position into the disengaged position, wherein the default position of the pawls 40 is the engaged position, and actuation of the control device 46 moves the pawls into the disengaged position.

In the embodiments depicted, the active material utilized for the control device 46, the actuator 48, and/or the return device 58 is preferably a Shape Memory Alloy (SMA). However, other active materials may be used within the scope of the claimed invention. Suitable active materials include, without limitation, shape memory alloys (SMA), shape memory polymers (SMP), piezoelectric materials, electroactive polymers (EAP), and ferromagnetic materials.

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

The shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, thermoelectric heating and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Electroactive polymers include those polymeric materials that exhibit piezoelectric, pyroelectric, or electrostrictive properties in response to electrical or mechanical fields. A typical dielectric elastomer actuator, which is a class of electroactive polymer actuators, comprises a slab of elastic (usually, rubber-like) dielectric material sandwiched between two flexible electrodes. The application of a potential difference across the electrodes results in the accumulation of opposite charges on the two electrodes. The resulting electrostatic attraction tends to pull the two electrodes together, which results in squeezing the rubbery slab (these materials are substantially incompressible). This results in an enlargement of the electroded surface area of the slab accompanying a reduction in the slab thickness. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversible lockdown mechanism.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity and a large elastically recoverable deformation, a high dielectric constant, and the like. In one embodiment, the polymer is selected such that is has an elastic modulus at most about 100 MPa. In another embodiment, the polymer is selected such that is has a maximum actuation stress between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation, e.g., a straightened shape orientation.

Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR, THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(methacrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof; and Group VIA and IIB compounds, such as CdSe, CdS, GaAs, AgCaSe 2, ZnSe, GaP, InP, ZnS, and mixtures thereof. Suitable active materials include, without limitation, shape memory alloys (SMA), ferromagnetic SMAS, shape memory polymers (SMP), piezoelectric materials, electroactive polymers (EAP), magnetorheological fluids and elastomers (MR), and electrorheological fluids (ER).

The activation signal utilized for the control signal and/or the actuation signal may include a heat signal, a magnetic signal, an electrical signal, a fluidic signal, a mechanical signal, and the like, and combinations comprising at least one of the foregoing signals, with the particular activation signal dependent on the materials and/or configuration of the active material. For example, a magnetic and/or an electrical signal may be applied for changing the property of the active material fabricated from magnetostrictive materials. A heat signal may be applied for changing the property of the active material fabricated from shape memory alloys and/or shape memory polymers. An electrical signal may be applied for changing the property of the active material fabricated from electroactive materials, piezoelectrics, electrostatics, and/or ionic polymer metal composite materials.

While the best modes for carrying out the invention have been described in detail, those familiar with the art to which this invention relates will recognize various alternative designs and embodiments for practicing the invention within the scope of the appended claims.

The invention claimed is:

1. A clutch comprising:
    a drive shaft extending along and rotatable about a longitudinal axis and configured for supplying torque;
    a ratchet attached to said drive shaft for rotation with said drive shaft about said longitudinal axis and including a plurality of teeth extending radially outward away from said longitudinal axis;
    a hub rotatably coupled to said drive shaft for rotation about said longitudinal axis relative to said drive shaft, said hub including at least one pawl extending radially inward toward said ratchet;
    said at least one pawl moveable between a disengaged position and an engaged position with said at least one pawl disengaged from said plurality of teeth when in said disengaged position, and said at least one pawl engaged with said plurality of teeth when in said engaged position for rotating said ratchet and said drive shaft about said longitudinal axis;
    a control device attached to said at least one pawl, said control device moveable between an un-actuated position and an actuated position, wherein said control device positions said at least one pawl in one of said engaged position and said disengaged position when said control device is in said actuated position, and said control device permits said at least one pawl to move into another of said engaged position and said disengaged position when said control device is in said un-actuated position; and
    an actuator having a first end attached to said hub and a second end configured for attachment to a support, wherein said actuator is moveable between an un-rotated position and a rotated position for rotating said hub in a single direction about said longitudinal axis to drive the ratchet.

2. A clutch as set forth in claim 1 wherein said control device includes an active material control device.

3. A clutch as set forth in claim 2 wherein said control device is further attached to said hub and is configured to exert an actuation force to move said at least one pawl from said disengaged position into said engaged position.

4. A clutch as set forth in claim 3 wherein said active material control device includes an active material chosen from a group of active materials including: a shape memory alloy, a piezoelectric material, an electroactive polymer, a ferromagnetic shape memory alloy, a magnetostrictive material and an electrostrictive material.

5. A clutch as set forth in claim 1 wherein said actuator includes an active material actuator.

6. A clutch as set forth in claim 5 wherein said active material actuator is spirally wound about an outer periphery of said hub and is configured to contract to rotate said hub in said single direction about said longitudinal axis.

7. A clutch as set forth in claim 6 wherein said active material actuator includes an active material chosen from a group of active materials including: a shape memory alloy, a piezoelectric material, an electroactive polymer, a ferromagnetic shape memory alloy, a magnetostrictive material and an electrostrictive material.

8. A clutch as set forth in claim 1 wherein said at least one pawl is integrally formed with said hub from a compliant material biasing said at least one pawl into said disengaged position.

9. A clutch as set forth in claim 1 further comprising a pivotable connection interconnecting said at least one pawl and said hub with said at least one pawl pivotable about a pivot axis during movement between said engaged position and said disengaged position.

10. A clutch as set forth in claim 9 further comprising a return device attached to said at least one pawl and configured for biasing said at least one pawl into said disengaged position.

11. A clutch as set forth in claim 10 wherein said return device includes a spring.

12. A clutch as set forth in claim 10 wherein said return device includes an active material return device.

13. A clutch as set forth in claim 1 further comprising a re-set device coupled to said hub and configured for biasing said hub into said un-rotated position.

14. A rotary fluid motor comprising:
    a housing;
    an output shaft configured for supplying torque; and
    a clutch attached to said housing, said clutch including:
        a drive shaft coupled to said output shaft for supplying torque to said output shaft, said drive shaft extending along and rotatable about a longitudinal axis;
        a ratchet attached to said drive shaft for rotation with said drive shaft about said longitudinal axis and including a plurality of teeth extending radially outward away from said longitudinal axis;
        a hub rotatably coupled to said drive shaft for rotation about said longitudinal axis relative to said drive shaft, said hub including at least one pawl extending radially inward toward said ratchet;
        said at least one pawl moveable between a disengaged position and an engaged position with said at least one pawl disengaged from said plurality of teeth when in said disengaged position, and said at least one pawl engaged with said plurality of teeth when in said engaged position for rotating said ratchet and said drive shaft about said longitudinal axis;
        a control device including an active material and attached to said at least one pawl and said hub, said control device configured to exert a force to move between an un-actuated position and an actuated position, wherein said control device positions said at least one pawl in one of said engaged position and said disengaged position when said control device is in said actuated position, and said control device permits said at least one pawl to move into another of said engaged position and said disengaged position when said control device is in said un-actuated position; and
        an actuator including an active material and configured to exert a force to rotate said hub in a single direction about said longitudinal axis from an un-rotated position into a rotated position to drive the ratchet;
        wherein said actuator is spirally wound around an outer periphery of said hub and includes a first end attached to said hub and a second end attached to said housing.

15. A rotary fluid motor as set forth in claim 14 wherein said active material of said control device and said actuator includes an active material chosen from a group of active materials including: a shape memory alloy, a piezoelectric material, an electroactive polymer, a ferromagnetic shape memory alloy, a magnetostrictive material and an electrostrictive material.

* * * * *